US006854740B2

(12) United States Patent
Baumann et al.

(10) Patent No.: US 6,854,740 B2
(45) Date of Patent: Feb. 15, 2005

(54) TOOL MOUNTING FOR A HAND MACHINE TOOL

(75) Inventors: Otto Baumann, Leinfelden-Echterdingen (DE); Helmut Heinzelmann, Leinfelden-Echterdingen (DE); Hardy Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 10/221,881

(22) PCT Filed: Aug. 16, 2001

(86) PCT No.: PCT/DE01/03148

§ 371 (c)(1),
(2), (4) Date: Sep. 16, 2002

(87) PCT Pub. No.: WO02/20224

PCT Pub. Date: Mar. 14, 2002

(65) Prior Publication Data

US 2003/0137114 A1 Jul. 24, 2003

(30) Foreign Application Priority Data

Sep. 8, 2000 (DE) ........................................ 100 44 387

(51) Int. Cl.[7] ............................................. B23B 31/107
(52) U.S. Cl. ......................... 279/19.6; 279/75; 408/240
(58) Field of Search ........................ 279/19, 19.3, 19.4, 279/19.5, 19.6, 22, 30, 75; 408/240

(56) References Cited

U.S. PATENT DOCUMENTS 1,124,627 A * 1/1915 Leyner ...................... 279/19.3
1,822,115 A * 9/1931 Shepherd ................... 279/19.3
2,128,935 A * 9/1938 Gartin ...................... 279/19.3
4,047,722 A * 9/1977 Nielsen et al. ............ 279/19.5
4,284,284 A * 8/1981 Sides ........................ 279/19.5
5,199,833 A 4/1993 Fehrle
5,388,842 A * 2/1995 Piras et al. ................ 279/19.5
6,092,814 A * 7/2000 Kageler ..................... 279/19.4
6,224,303 B1 * 5/2001 Wheeler et al. ........ 408/239 R
6,234,491 B1 * 5/2001 Wheeler ..................... 279/143
2004/0011542 A1 * 1/2004 Comarmond ............... 173/132

FOREIGN PATENT DOCUMENTS

DE 2353679 A * 6/1974 ........... B25D/17/08
DE 197 24 532 A1 12/1998
DE 100 02 749.0 1/2000
EP 0 476 387 A 3/1992

* cited by examiner

*Primary Examiner*—Daniel W. Howell
(74) *Attorney, Agent, or Firm*—Michael J. Striker

(57) ABSTRACT

The tool mount has a body (12) with means for housing a tool with grooves, whereby the body (12) is equipped with a damping mechanism (14, 16, 18, 20) with which the tool can be clamped in position in the body (12), and an operating element (24) for unclamping the tool is provided.

A wear-resistant tool mount requiring low production expenses has a housing sleeve (34) for the tool. The housing sleeve is inserted in the body (12) and is made of a harder material than the body (12).

7 Claims, 1 Drawing Sheet

TOOL MOUNTING FOR A HAND MACHINE TOOL

BACKGROUND OF THE INVENTION

The present invention concerns a tool mount for a hand power tool having a rotating and/or an impacting drive, whereby the tool mount has a body with means for housing a tool with grooves, the body is equipped with at least one clamping mechanism with which the tool can be clamped in position in the body, and an operating element for unclamping the tool is provided.

A tool mount of this type was made known, for example, in DE 197 24 532 A1 or the non-prior-printed German application 100 02 749.0. In the case of this known tool mount, the body has a mounting hole into which the appropriate tool is inserted with its shaft and can be fixed in position therein by means of a clamping mechanism. "Rotary driving rods" are located in the mounting hole of the body that engage in open grooves on the end of the tool shank to ensure that the tool is driven in rotary fashion. The rotary driving gibs in the mounting hole of the body are typically produced by means of broaching or swaging.

On the one hand, the tool mount must be simple and cost-effective to produce and, on the other, resistance to wear is required. Experience has shown that tool mounts wear primarily in the area of the rotary driving rods and in the tool guide as a result of relative motions and the transfer of high amounts of torque between the body and the grooves of the tool inserted therein. Even in the case of small hammer drills and impact drills, the impact energy is often so great that special technical measures become necessary to counteract the wear on the tool mount.

The invention is therefore based on the object of providing a tool mount of the type described initially that is designed in such a fashion that it can be produced at the lowest possible expense and, on the other hand, the wear occurring therein is as minimal as possible.

SUMMARY OF THE INVENTION

The stated object is attained with the features in claim 1 by the fact that a housing sleeve is inserted in the body of the tool mount, which said housing sleeve is made of a harder material than the body. This measure makes it possible to produce the body out of an easily-machinable steel, and to select a hardened steel for the housing sleeve that has the greatest possible wear resistance. The housing sleeve can be produced economically out of wear-resistant steel, for example, by means of round kneading or extrusion or sintering, or using a precision-casting method.

The stated object is attained by the fact that a housing sleeve is inserted in the body of the tool mount, which said housing sleeve is made of a harder material than the body. This measure makes it possible to produce the body out of an easily-machinable steel, and to select a hardened steel for the housing sleeve that has the greatest possible wear resistance. The housing sleeve can be produced economically out of wear-resistant steel, for example, by means of round kneading or extrusion or sintering, or using a precision-casting method.

So that the at least one clamping body can enter the groove in the tool shank that is inserted in the housing sleeve, the housing sleeve is provided with at least one recess that can be produced in a milling step, for example.

Preferably, at least one rotary driving rod is integrally molded in the interior of the housing sleeve, which said rotary driving rod engages in a groove in the tool shank. This rotary driving rod can be formed in the housing sleeve by means of extrusion or swaging, for example.

Another advantageous further development of the housing sleeve lies in the fact that it has a collar on its end closest to the opening for receiving the tool, which said collar forms an axial stop on the body. This provides the housing sleeve with a particularly secure seat in the axial direction.

A particularly good frictional connection between the housing sleeve and the body is obtained by the fact that the housing sleeve is interconnected with the body by means of brazing. In the case of a housing sleeve having a collar at the front, it is advantageous to provide a recess in the region of this collar for accommodating the brazing material.

The body is advantageously provided with at least one clamping body that is capable of being guided in a groove located on the shank end of the tool, and that is held in its clamped position by a retaining element that is capable of being guided via the operating element into a position that radially exposes the clamping body.

The use, according to the invention, of a wear-resistant housing sleeve ensures a high degree of true running of the tool in the tool mount.

BRIEF DESCRIPTION OF THE DRAWINGS

The invention is described in greater detail hereinbelow with reference to two exemplary embodiments shown in the drawings.

DETAILED DESCRIPTION OF THE PREFERRED EMBODIMENTS

Figure 1:
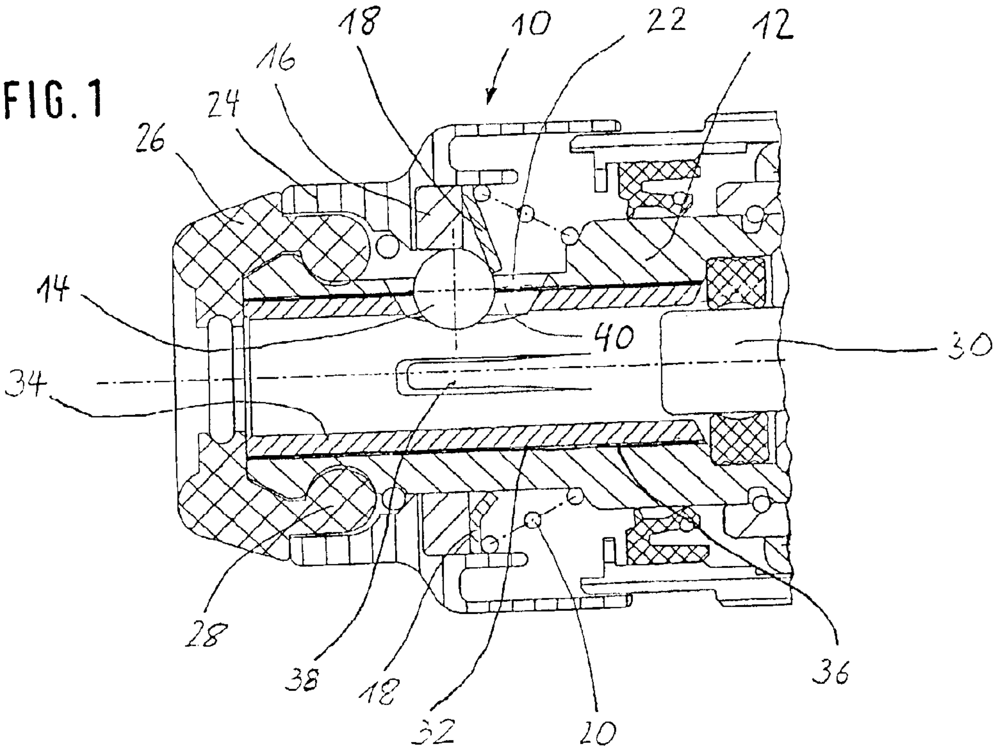
FIG. 1 shows a longitudinal sectional drawing through a tool mount comprising a separate housing sleeve for the tool.

FIG. 1 shows sections of a cross section through a tool mount 10 that is located on a rotating and/or impacting hand power tool. This tool mount 10 is used to mount tools with grooves. The tool mount 10 has a body 12 in which a radially displaceable clamping body—a clamping ball 14 in the exemplary embodiment—is supported. This clamping ball 14 is capable of being guided into a groove located on the shank end of the tool (not shown in the drawing), and it is held in its clamped position by a retaining sleeve 16 that can be moved axially within limits, and by a holding sleeve 16. The retaining sleeve 16 is loaded in the direction of its retaining position by a compression spring 20 via the holding sleeve 18. The compression spring 20 is supported, at the machine end, on the body 12. The retaining sleeve 16 is also supported on the body 12.

When the clamping ball 14 is in the clamped position, the retaining sleeve 16 covers the clamping ball 14 radially, and the holding sleeve 18 secures the clamping ball 14 in the axial direction. When the tool is inserted (e.g., drill bit, chisel, etc.), the clamping ball 14 is moved by the shank end of the tool in a recess 22 of the body 12 in the direction of insertion of the tool. The holding sleeve 18 is pushed via the clamping ball 14 against the compression spring 20, which results in an open space being created between the retaining sleeve 16 and the holding sleeve 18, into which open space the clamping ball 14 can shift radially outwardly. If the tool is now inserted into the tool mount 10 so far that the groove on its shank end is located underneath the clamping ball 14, the preloaded compression spring 20 pushes the holding sleeve 18 into its home position and presses the clamping ball 14 into the groove of the tool.

An unclamping mechanism is provided so that the tool can be removed from the tool mount 10, which said unclamping mechanism is composed of an operating sleeve 24 that is supported on the body 12 in axially displaceable fashion. To unclamp the tool, the operating sleeve 24 is used to push the retaining sleeve 16 against the holding sleeve 18 and against the compression spring 20 loading the holding sleeve 18, so that the clamping ball 14 can shift radially outwardly and the tool can be removed. The compression spring 20 then presses the holding sleeve 18, the retaining sleeve 16, the clamping ball 14 and the operating sleeve 24 back into their home positions.

In deviation from the exemplary embodiment shown, the tool mount 10 can be equipped with any other type of clamping mechanism.

A dust cap is secured to the body 12 on the tool end in positive fashion via a snap-in locking 28, which said dust cap prevents dust from entering the area of the clamping mechanism on the tool end.

A punch dolly 30 is also shown in FIG. 1 that extends into the body 12 on the machine end and serves to make the tool move in impacting motions.

For production-engineering reasons, the body is composed of easily machinable steel. Since this type of steel would not be sufficiently wear-resistant in the tool mounting region, a housing sleeve 34 made of wear-resistant, hard steel is used in the body 12 in a mounting hole 32 provided for this purpose. This can be steel that has been subjected to an extra hardening process.

In order to produce a frictional connection between the housing sleeve 34 and the body 12, brazing material is applied in the mounting hole 32 between the housing sleeve 34 and the body 12, which said brazing material joins the housing sleeve 34 with the body 12 after a soldering process. The particular hardening of the housing sleeve 34 can also take place using the soldering heat available after the brazing process.

For example, 16MnCrS5 or 9SMn28K can be used as the material for the body 12, and the housing sleeve 34 can be composed of HSS or 100 Cr6, for example.

At least one rotary driving rod 38 is integrally molded in the housing sleeve 34, which said rotary driving rod engages in a groove located on the end of the tool shank, and therefore transfers the rotary motion of the body 12 to a rotary motion of the tool. Since the housing sleeve 34 with the rotary driving rod is composed of hard steel, the susceptibility to wear of the rotary driving rod in particular—which is subjected to high mechanical loads—is greatly reduced.

The housing sleeve 34 must be provided with a recess 40 below the recess 22 of the body 12 so that the clamping ball 14 placed in the body 12 can enter the groove located in the tool shank.

Before the housing sleeve 34 is inserted into the mounting hole 32 of the body 12, the recess 40 and the rotary driving rod 38 can be produced by means of milling or suitable forming methods, for example. It is also possible, however, to produce the recess 40 and the driving rod 38 once the housing sleeve 34 has been soldered in the mounting hole 32. The recess 22 in the body 12 and the recess 40 in the housing sleeve 34 can thereby by produced in one step, e.g., by milling. Additionally, tolerance refinements can be carried out subsequently by means of broaching processes in the housing sleeve 34 that has already been soldered in the mounting hole 32.

Figure 2:
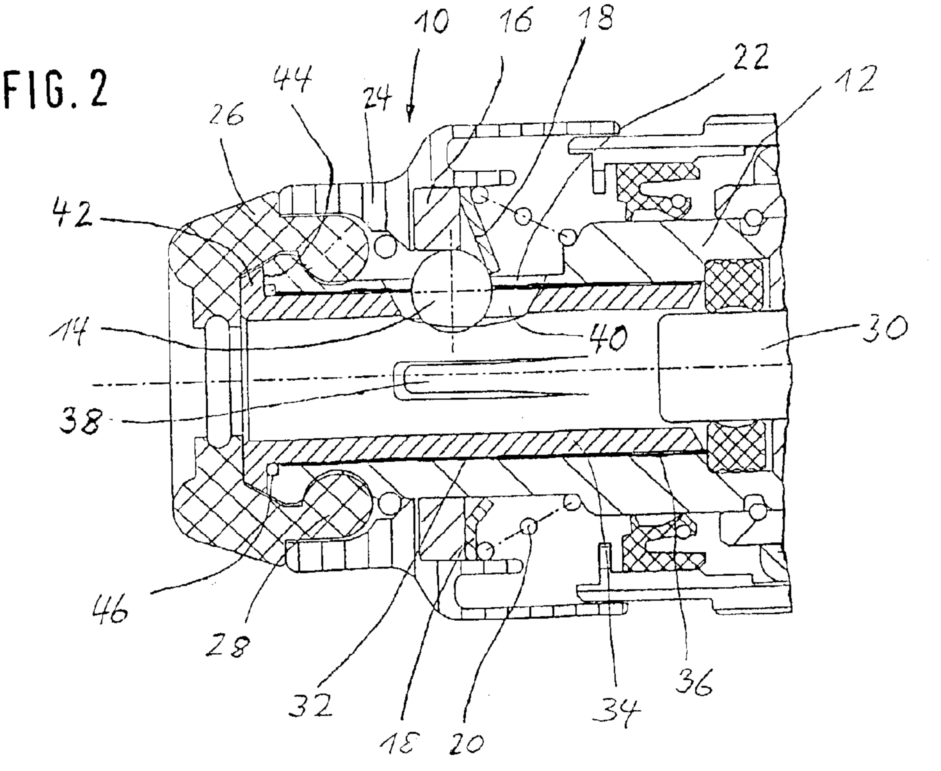
FIG. 2 shows a longitudinal sectional drawing through a tool mount comprising a housing sleeve having a collar at the front.

A variant of the exemplary embodiment in FIG. 1 is shown in FIG. 2. Components that are essentially identical are labelled with the same reference numerals in the exemplary embodiments presented. With regard for features and functions that remain the same, reference is made to the description of FIG. 1. The exemplary embodiment of the tool mount shown in FIG. 2 differs from the exemplary embodiment shown in FIG. 1 by the fact that the housing sleeve 34 is provided with a collar on its end closest to the opening for receiving the tool, which said collar forms an axial stop on a stopping face 44, provided for this purpose, located at the front on the body 12. As a result of this, the housing sleeve 34 is provided with a particularly secure axial seat in the body 12. The stopping face 44 can be provided with a recess 46 extending radially around the full perimeter, for example, in which said recess a brazing material can be applied to fix the collar 42 to the stopping face 44.

What is claimed is:

1. A tool mount for a hand power tool, comprising:

a rotating and/or an impacting drive, wherein the tool mount (10) has a body (12) with means for housing a tool with grooves, wherein the body (12) is equipped with a clamping mechanism (14, 16, 18, 20), wherein the tool can be clamped in position in the body (12) with the clamping mechanism; and an operating element (24) for unclamping the tool, wherein the means for housing the tool comprise a housing sleeve (34) inserted in the body (12), which wherein said housing sleeve is made of a harder material than the body (12), wherein the housing sleeve (34) is provided with at least one recess (40), and wherein the at least one clamping body (14) can enter the groove in a tool shank through the at least one recess (40).

2. The tool mount according to claim 1, wherein the housing sleeve (34) is made of hardened steel.

3. The tool mount according to claim 1, wherein at least one rotary driving rod (38) is integrally molded in the housing sleeve (34), wherein said rotary driving rod engages in a groove in a tool shank.

4. The tool mount according to claim 1, wherein the housing sleeve (34) has a collar (42) on an end closest to the opening to receive the tool, wherein said collar forms en axial stop on the body (12).

5. The tool mount according to claim 4, wherein the collar (42) has a stopping face (44) located at the front of the collar (42) of the housing sleeve, and wherein the body (12) is provided with a recess (46) for accommodating brazing material in a region of the stopping face (44).

6. The tool mount according to claim 1, wherein the housing sleeve (34) is interconnected with the body (12) by means of brazing (36).

7. The tool mount according to claim 1, wherein the body (12) is provided with at least one clamping body (14), wherein the at least one clamping body is capable of being guided into a groove located on a shank end of the tool and is held in a clamped position by a retaining element (16), wherein the retaining element is capable of being guided via the operating element (24) into position that radially exposes the clamping body (14).

* * * * *